Figure 1:
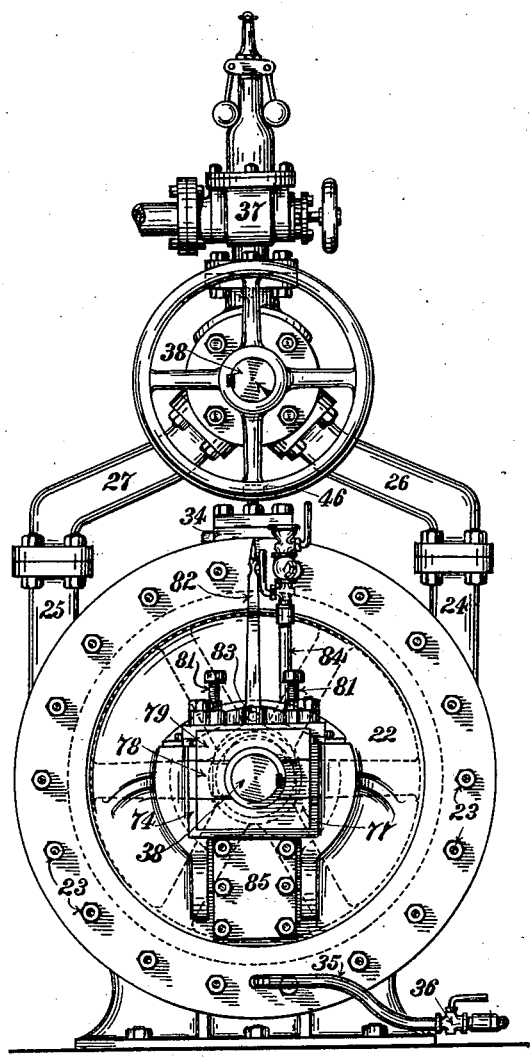

No. 722,560. PATENTED MAR. 10, 1903.
W. BUCKINGHAM.
ROTARY ENGINE.
APPLICATION FILED JULY 15, 1902.

NO MODEL. 11 SHEETS—SHEET 1.

Witnesses

Inventor
WILLIAM BUCKINGHAM
per
Attorney

No. 722,560. PATENTED MAR. 10, 1903.
W. BUCKINGHAM.
ROTARY ENGINE.
APPLICATION FILED JULY 15, 1902.
NO MODEL. 11 SHEETS—SHEET 2.

Witnesses

Inventor
WILLIAM BUCKINGHAM
per
Attorney

No. 722,560. PATENTED MAR. 10, 1903.
W. BUCKINGHAM.
ROTARY ENGINE.
APPLICATION FILED JULY 15, 1902.
NO MODEL. 11 SHEETS—SHEET 4.

Witnesses

Inventor
WILLIAM BUCKINGHAM
per Fred Walsh
Attorney

No. 722,560. PATENTED MAR. 10, 1903.
W. BUCKINGHAM.
ROTARY ENGINE.
APPLICATION FILED JULY 15, 1902.
NO MODEL. 11 SHEETS—SHEET 5.

Witnesses
M. Handrick
P. Tiddy.

Inventor
WILLIAM BUCKINGHAM
per Fred Walsh
Attorney

No. 722,560.  
PATENTED MAR. 10, 1903.  
W. BUCKINGHAM.  
ROTARY ENGINE.  
APPLICATION FILED JULY 15, 1902.  
NO MODEL.  
11 SHEETS—SHEET 6.

Witnesses  
M. J. Handrick  
P. Tiddy

Inventor  
WILLIAM BUCKINGHAM  
per Fred Walsh  
Attorney

No. 722,560.
PATENTED MAR. 10, 1903.
W. BUCKINGHAM.
ROTARY ENGINE.
APPLICATION FILED JULY 15, 1902.
NO MODEL.
11 SHEETS—SHEET 7.
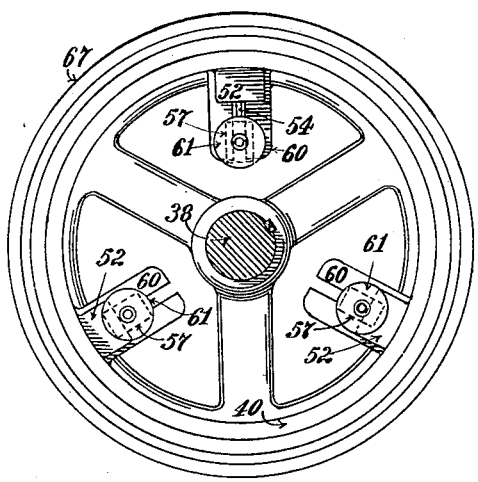
FIG. 8.
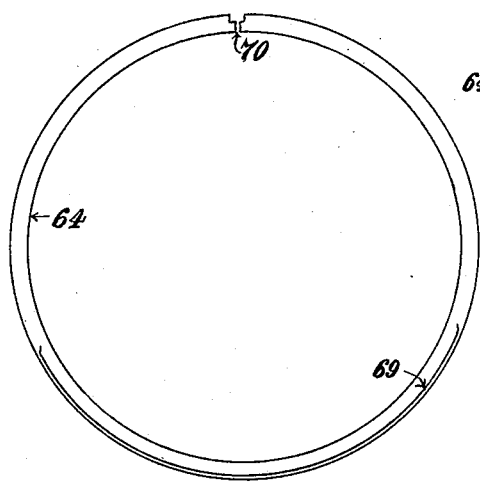 
FIG. 10.  FIG. 11.
Witnesses
Inventor
WILLIAM BUCKINGHAM
per Fred Walsh
Attorney No. 722,560.  
PATENTED MAR. 10, 1903.  
W. BUCKINGHAM.  
ROTARY ENGINE.  
APPLICATION FILED JULY 15, 1902.  
NO MODEL.  
11 SHEETS—SHEET 8.

Witnesses  
M. Handrick  
P. Tiddy

Inventor  
WILLIAM BUCKINGHAM  
per Fred Walsh  
Attorney

No. 722,560. PATENTED MAR. 10, 1903.
W. BUCKINGHAM.
ROTARY ENGINE.
APPLICATION FILED JULY 15, 1902.
NO MODEL. 11 SHEETS—SHEET 9.
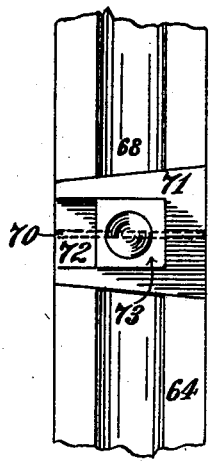
Fig. 14.
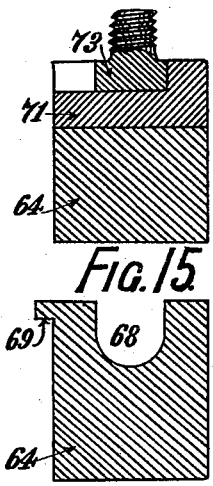
Fig. 15.
Fig. 16.
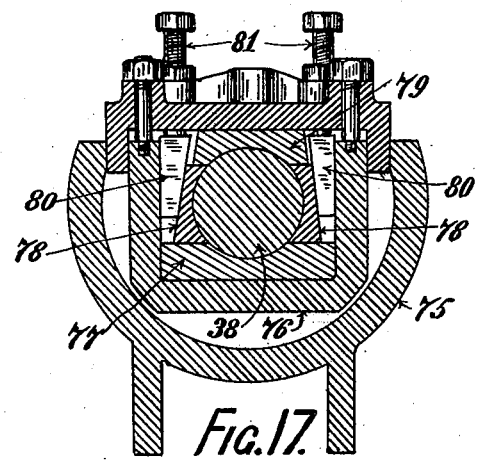
Fig. 17.
Witnesses
Inventor
WILLIAM BUCKINGHAM
per Fred Walsh
Attorney No. 722,560. PATENTED MAR. 10, 1903.
W. BUCKINGHAM.
ROTARY ENGINE.
APPLICATION FILED JULY 15, 1902.
NO MODEL. 11 SHEETS—SHEET 11.

Witnesses

Inventor
WILLIAM BUCKINGHAM
per
Attorney

UNITED STATES PATENT OFFICE.

WILLIAM BUCKINGHAM, OF SYDNEY, NEW SOUTH WALES, AUSTRALIA.

ROTARY ENGINE.

SPECIFICATION forming part of Letters Patent No. 722,560, dated March 10, 1903.

Application filed July 15, 1902. Serial No. 115,720. (No model.)

*To all whom it may concern:*

Be it known that I, WILLIAM BUCKINGHAM, draper, a subject of the King of Great Britain, residing at Nos. 171 and 173 Riley street, Sydney, in the State of New South Wales and Commonwealth of Australia, have invented new and useful Improvements in Annular-Chamber Types of Rotary Engines and Pumps, of which the following is a specification.

This invention refers to those rotary engines and pumps which are actuated by fluid-pressure and have an annular chamber provided with an abutment and a disk or piston barrel therein carrying sliding vanes or pistons, between which piston-vanes and the abutment the power is exerted. These improvements in such types of rotary engines and pumps relate to the particular combination, with the supply and exhaust ports, of a three-way cock to form a starting, stopping, and reversing valve for controlling the admission of fluid-pressure to the annular chamber, to the peculiar construction of the abutment with cod-piece and accessories, to the particular combination with the piston-vanes of devices for imparting and controlling their sliding motion, to the peculiar construction of adjustable bearings for the main shaft, and to the peculiar construction of packing (a) between the ends of the cod-piece and the end walls of the cod-box, (b) between the ends of the cod-piece and the end walls of the annular chamber, (c) between the ends of the piston-vanes and the ends of the chamber during part of the circular travel, (d) between the piston-barrel and the end walls of the chamber, and (e) between the piston-barrel and the internal circular periphery of the chamber; but in order that this invention may be clearly understood reference will now be made to the drawings, in which—

Figure 2:
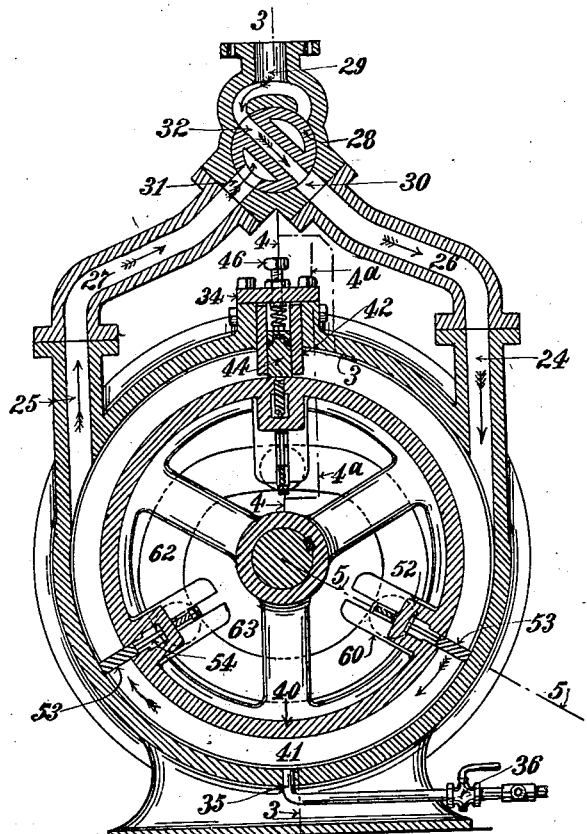
Figure 3:
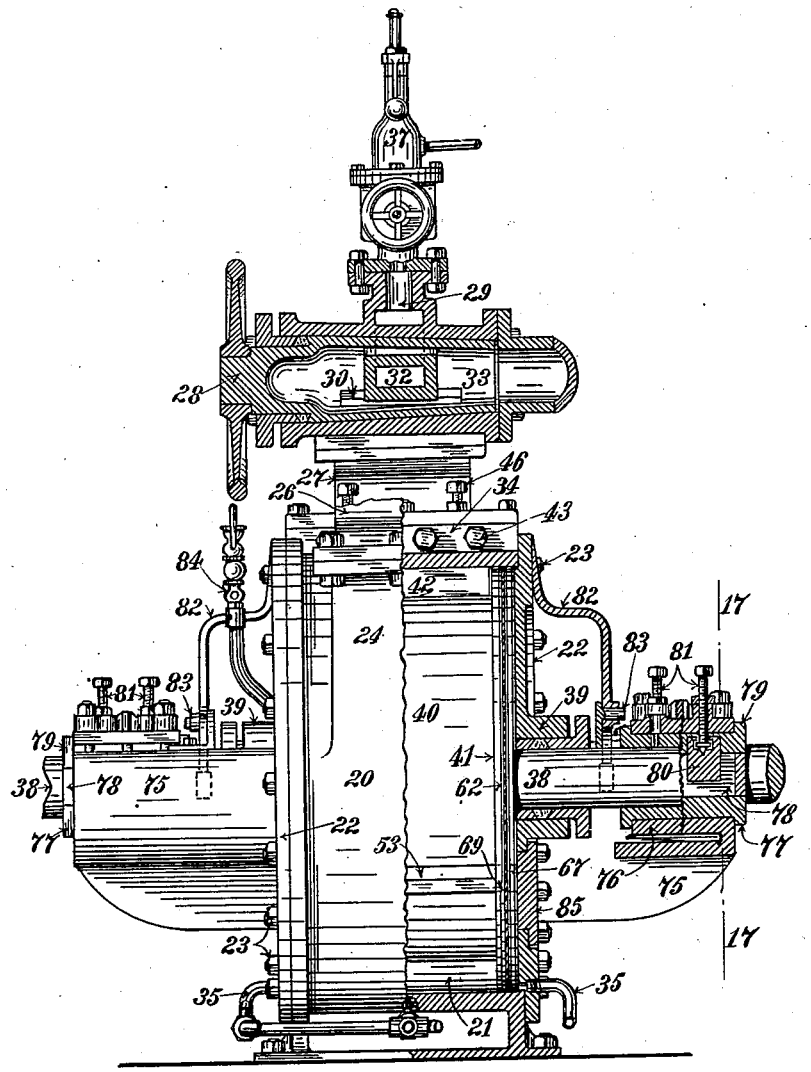
Figure 4:
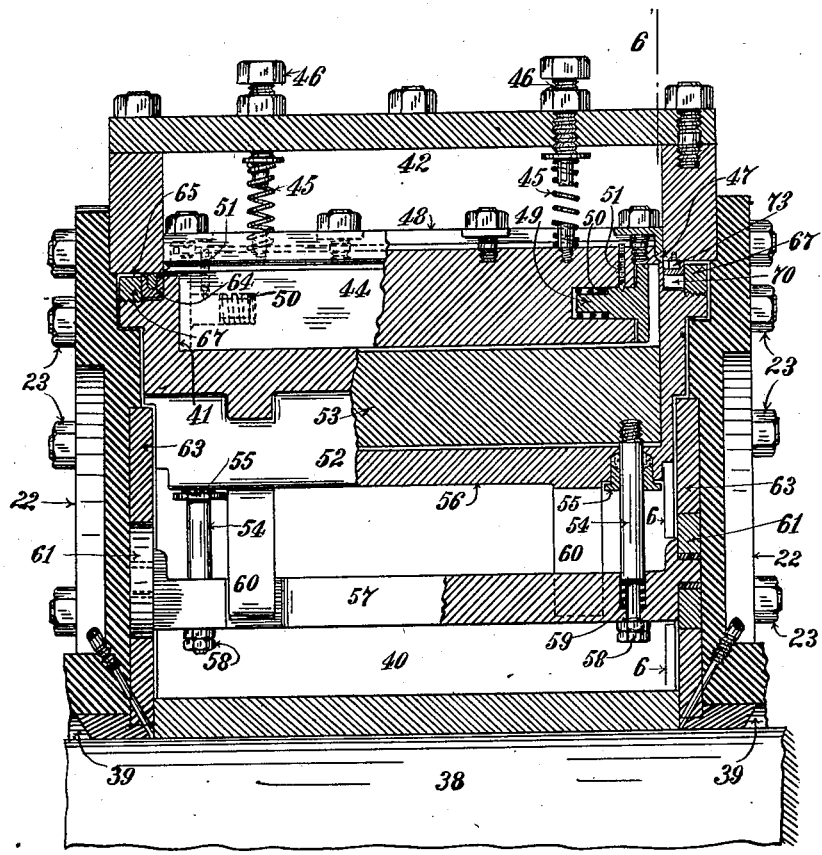
Figure 5:
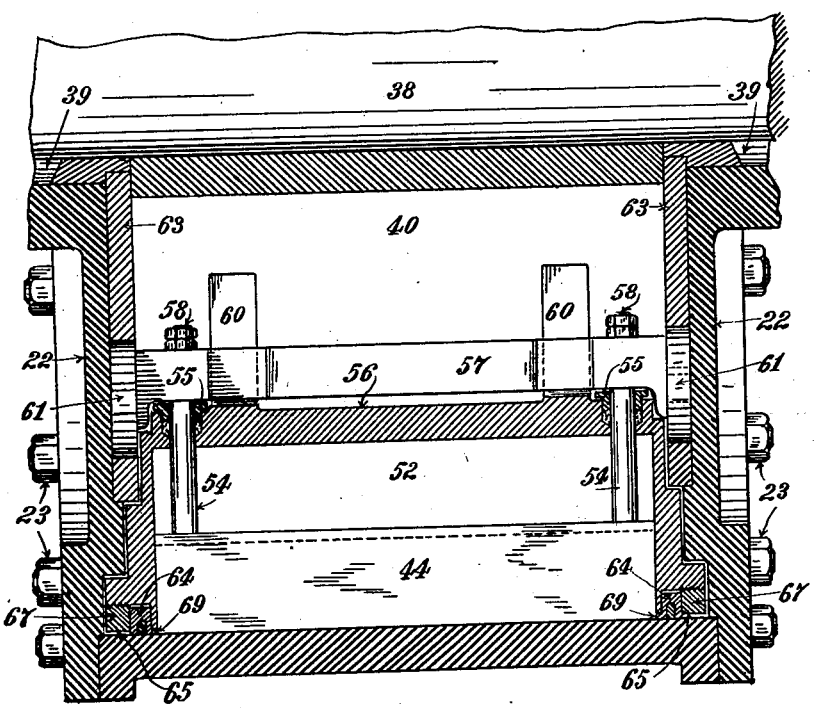
Figure 6:
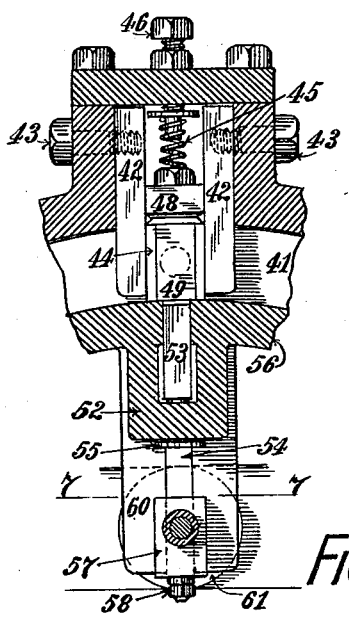
Figure 7:
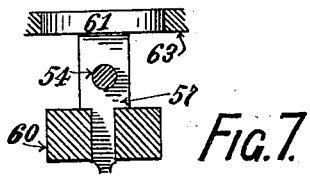
Figure 9:
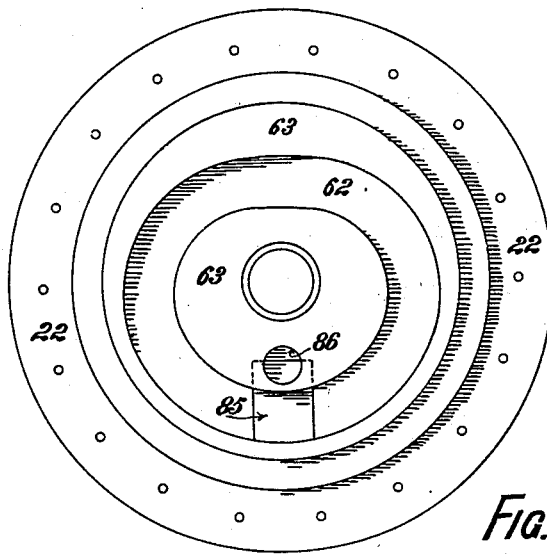
Figures 12, 13:
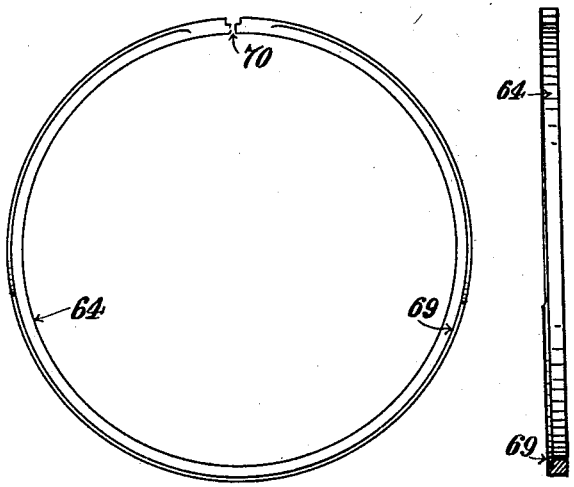
Figure 18:
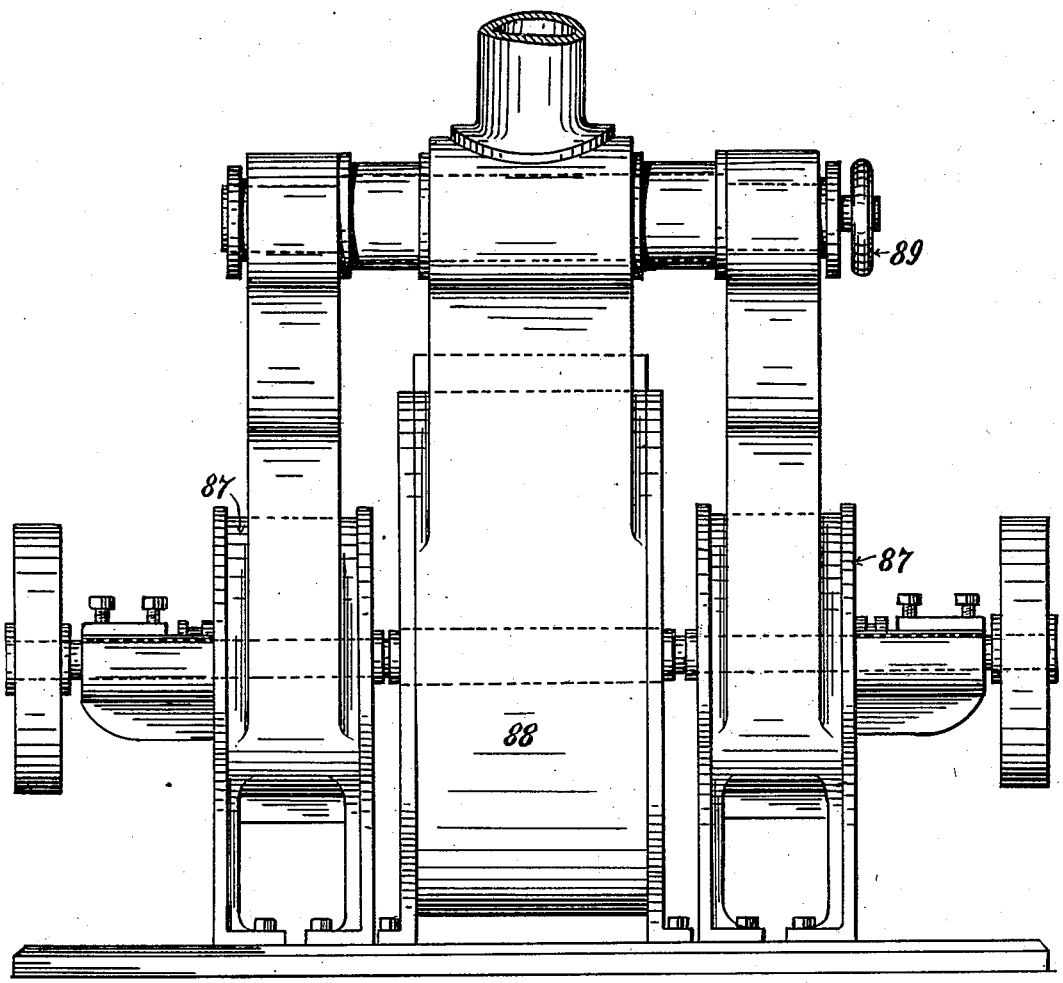
Figure 19:
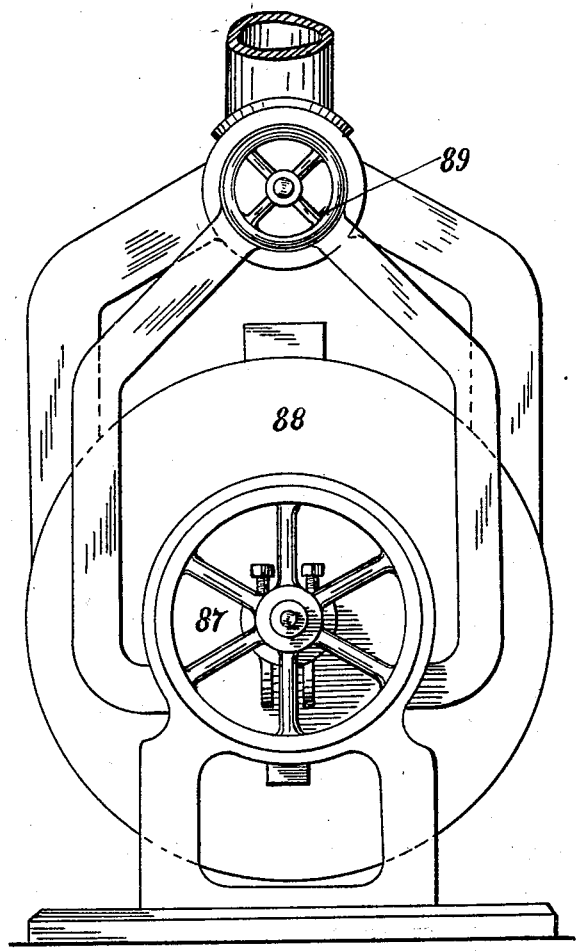

Figure 1 is an end elevation of a reversible steam-engine embodying these present improvements; Fig. 2, a vertical sectional elevation taken centrally through the supply and exhaust ports; and Fig. 3, a longitudinal elevation, partly in section, of the same on the line 3 3 in Fig. 2. Figs. 4 and 5 are vertical sectional elevations, to an enlarged scale, taken on the lines 4 4 and 4ᵃ 4ᵃ and the lines 5 5, respectively, in Fig. 2. Fig. 6 is a vertical sectional elevation taken on the line 6 6 in Fig. 4, showing a piston-vane with its controlling devices passing the abutment and cod-piece, while Fig. 7 is a sectional plan of the controlling devices of the piston-vanes, taken on the line 7 7 in Fig. 6. Fig. 8 is an end view of the piston-barrel, showing the rollers of the controlling devices of the piston-vanes; and Fig. 9 is an internal face view of the chamber end or cover, showing the cam-track for said rollers. Fig. 10 is a face view, and Fig. 11 a central sectional view, respectively, of split packing-ring between the cylindrical periphery of the chamber and the working end face of the piston-barrel; and Figs. 12 and 13 are similar views of a modified construction of such packing-ring. Figs. 14, 15, and 16, to an enlarged scale, are respectively a peripheral face view and sections of the packing-ring at the split, showing the holding against revolution with the piston-barrel and the expanding devices. Fig. 17 is a vertical transverse sectional elevation of adjustable bearing of the main shaft, taken on the lines 17 17 in Fig. 3. Figs. 18 and 19 are end and longitudinal elevations, respectively, of a three-chambered compound engine constructed according to these improvements.

The casing 20, with its covers or end walls 22 fixed thereto by studs and nuts 23, forms around the piston-barrel 40 the annular chamber 21, in which the power is exerted. On the casing 20 and leading to it are pipes or ports 24 and 25, used alternately as supply and exhaust ports, these being joined up to pipes 26 and 27, connecting to the three-way cock 28, into which fluid-pressure—say steam—enters by way of branch 29 and from which are exit-orifices 30 and 31. The plug of the cock 28 has a through-passage 32 and a side passage and end exit or escape port 33 on the casing. Medially between the ports 24 and 25 is the abutment-box 34, in which is the sliding cod-piece hereinafter described, and at the bottom are drain-pipes 35, connected to drain-cocks 36. Above or before the cock 28 is fixed a governor 37 and throttle-valve of any approved construction.

The main shaft 38 sits in adjustable bearings (hereinafter fully described) supported by the end walls 22 and passes through stuffing-boxes 39 with ordinary glands. On this main shaft is keyed or otherwise fastened piston-barrel 40, carrying in pockets the sliding vanes or pistons, as hereinafter described. From the main shaft 38 the power may be transmitted as ordinarily to where required.

The abutment-box 34 has a steam-tight cover and is provided with liners or cheeks 42, held in place by screw-bolts 43. The cod-piece 44 is adapted to slide between the liners 42 and by the pressure of springs 45 (adjustable by means of set-screws 46) to bear hard upon the periphery of barrel 40 and make a steam-tight joint thereon. To prevent leakage around the abutment, india-rubber or other approved packing 47 of triangular section is fitted in a groove made by the chamfered edges of the cod-piece 44 and of a shoe 48 between it and the springs 45. The ends of said cod-piece 44 make a tight joint against flanges 41 of the piston-barrel 40 by means of shoes 49, pressed toward said flanges by springs 50. This cod-piece 44, having these steam-tight working devices, provides an effectual partition or division between the live steam and the exhaust, notwithstanding the revolution of the piston-barrel 40. To facilitate removal of the cod-piece, the shoes 49 are locked in place by screws 51, being screwed into the sockets 52, though to allow free action these screws 51 are normally clear of the cod-piece.

The piston-barrel 40 has end flanges 41, and in it are three pockets 52 for the radial piston-vanes 53, which are adapted to slide in and out of said pockets. Each vane 53 has back rods 54 passing through stuffing-boxes and glands 55 in the wall 56 of the barrel 40 to a cross-bar 57 internally of said wall 56, to which bar 57 it is affixed by jam-nuts 58 against the power of spring 59 to allow for a slight amount of resilient adjustability to the pressure of the outer edge of said vane on the peripheral face of the chamber 21. Each cross-bar 57 works in guides 60, protruding inwardly from the wall 56, and it carries upon its either end roller 61, fitting a cam-groove 62 in a liner 63 in the inner face of the end walls 22. The formation or course or shape of said groove 62 regulates the sliding action of each vane 53, extending it across the annular chamber to receive the full impact of the steam and housing it in its pocket 52 as it passes the exhaust-port and the abutment with the cod-piece. There might be any number of piston-vanes, although I prefer three, and with these the construction of cam-groove I have found most advantageous for the economic use of steam is that illustrated, Fig. 9.

The power or steam cannot pass around lengthwise of the vanes 53 by reason of the stuffing-boxes and glands 55, and it is prevented from passing around the ends by means of a facing-strip on the barrel-packing hereinafter described.

The piston-barrel 40 keeps the annular chamber 21 steam-tight at the ends and on the circular periphery by means of a fast packing or split piston-ring 64, bearing steam-tightly against the said circular periphery and having bearing steam-tightly on its edge the end of the flange 41 of said barrel. The end faces of the barrel 40 and flanges 41 conform to the face of the end walls and the liner 63 thereon and to the recess 65. The screwed end 66 of the barrel 40 and the ring-nut 67 fit into this recess. The function of this ring-nut 57 is to keep the piston-ring 64 in place and tightly against the outer face of flange 41 of the piston-barrel 40. This ring 64 carries asbestos or india-rubber or other packing inserted in groove 68.

A facing-strip or shoulder 69 extends from the ring 64 to meet the ends of the piston-vanes 53 and make a steam-tight joint against them, and this strip 69 may be nearly the whole way around, being just broken away at the split, (see Figs. 12 and 13,) or it may be but partially around, Figs. 10 and 11, or only just where the steam is exerting its greatest power. The split 70 of this ring 64 is in line with the cod-piece 44, and part of this split is tapered for the insertion of an expanding-wedge 71 to press said ring hard against the internal circular periphery of the chamber. In this wedge 71 is a cross-slot 72 to take upon the head of a screw-bolt 73 on the said periphery, which locks said ring 64 against revolving with the piston-barrel 40.

To provide for the wear in chamber 20 and specially for that caused by the thrust away from the supply-port when the engine is driven constantly in one direction, each bearing is supported on bracket 75 from cover or end wall 22 in the form of a pocket 76. In this pocket is bottom brass 77, side brasses 78, and top brass 79. Bearing against the sides of the pocket 76 and the tapered sides of brasses 78 are wedge-pieces 80 on the end of set-screws 81. As the screws 81 are adjusted in or out of their females the brasses 78 will be moved sidewardly and adjust the bearings as required. A forked telltale or pointer 82 on a pivot 83 embracing the shaft 38 will indicate what amount of divergence between the shaft and the chamber has taken place and also when adjusting the correcting of the same.

Lubricators 84 for the supply of oil to the shaft at the stuffing-boxes and into the cylinder are made, as shown, through both end walls 22, and through these walls are openings closed by doors 85, through which the rollers 57 are get-at-able, if desired. Orifices 86 through the liner 63 admit of the insertion of a spanner, &c., for the regulation of the jam-nuts 58 of the back rods 54 for the adjustment of the travel and tension of the piston-vanes.

In operation steam is admitted (by manipulation of the hand-wheel of cock 28) through branch 29 and passes through the passage 32 to one or other of the orifices 30 or 31—say to the orifice 30—whence it flows through pipe or port 24 to the chamber 21 between the flanges 41 of the piston-barrel 40, being confined therein by the packings described. The steam impinges and exerts its force upon the piston-vanes in rotation as they protrude on passing said port 24 and force them around until they commence to withdraw on passing the port 25, serving now as exhaust-port. The exhaust-steam passes from said port or pipe 25 through the passage 33 in cock 28 to a condenser or to waste, and thus the rotation of the main shaft 38 is assured. By reversing the cock 28 the action is similar, but in the opposite direction, the ports or pipes 24 and 25 conducting reversely the live and spent steam.

The compound engine (shown in Figs. 18 and 19) has its separate chambers and accessories constructed substantially as those hereinbefore described, though by reason of the varying angles at which steam is supplied to the high and low pressure chambers the thrust and the consequent side wear of the parts are neutralized or minimized.

The main shaft passes through the three cylinders having the two smaller or high-pressure chambers 87 outwardly of the large or low-pressure chamber 88. The small end cylinders might be detached from the main shaft for facility in construction and for repairs. The exhaust from both chambers 87 meet and pass as live pressure to the supply-port of the large cylinder 88. The controlling-valves are made on the same axis and are operated by the one hand wheel 89. These valves and the supply and exhaust ports are so arranged that the steam is supplied and exhausts at the lower port (instead of the upper port, as described in reference to the other figures of the drawings) of the smaller cylinder 87, and their exhaust is supplied and exhausts at the upper part of the large cylinder 88. By this arrangement the power of the steam is evenly distributed around the main shaft.

Having now particularly described and ascertained the nature of my said invention and in what manner the same is to be performed, I declare that what I claim is—

1. In a rotary engine, a casing, a revolving body in said casing, an abutment in said casing bearing against the periphery of said revolving body, a supply-port, an exhaust-port, means for controlling said ports, an eccentric groove in each end of said casing, and a plurality of sliding vanes 53 in pockets 52 in said revolving body having back rods 54 stuffing-boxes and glands 55 cross-bar 57 nuts 58 spring 59 rollers 61 and cam-back 62 substantially as herein described and explained and as illustrated in the drawings.

2. In a rotary engine, a casing, a revolving body in said casing, a peripheral flange at each end of said revolving body, the outer corner of each of said flanges being cut away, a pair of stationary rings in said casing, each fitting into the cut-away portion of one of said flanges, a ring upon each end of said revolving body, revolving therewith, engaging with said cut-away portion adjacent to said stationary ring, an abutment on the interior of said casing bearing against the periphery of said revolving body between said flanges, a plurality of sliding vanes in said revolving body, means for operating said vanes, a supply-port, an exhaust-port, and means for controlling said ports.

3. In a rotary engine, a casing, a revolving body in said casing, a peripheral flange at each end of said revolving body, the outer corner of each of said flanges being cut away, a pair of split stationary rings in said casing, each fitting into the cut-away portion of one of said flanges, means for expanding said split rings, a ring upon each end of said revolving body, revolving therewith, engaging with said cut-away portion adjacent to said stationary split ring, an abutment on the interior of said casing bearing against the periphery of said revolving body between said flanges, a plurality of sliding vanes in said revolving body, means for operating said vanes, a supply-port, an exhaust-port, and means for controlling said ports.

4. In a rotary engine, a casing, a supply-port, an exhaust-port, means for controlling said ports, a revolving body in said casing, a plurality of sliding vanes in said revolving body, an abutment in said casing bearing against the periphery of said revolving body, a shaft for said revolving body, and a plurality of bearings for said shaft, each of said bearings comprising a bottom piece 77, side pieces 78, top piece 79, wedge-pieces 80 and adjusting-screws 81, substantially as described.

In testimony whereof I have signed my name to this specification in the presence of two subscribing witnesses.

WILLIAM BUCKINGHAM.

Witnesses:
FRED WALSH,
PERCY MEWELL.